US007634809B1

(12) United States Patent
Schneider et al.

(10) Patent No.: US 7,634,809 B1
(45) Date of Patent: Dec. 15, 2009

(54) DETECTING UNSANCTIONED NETWORK SERVERS

(75) Inventors: Kenneth Schneider, San Francisco, CA (US); Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 845 days.

(21) Appl. No.: 11/078,451

(22) Filed: Mar. 11, 2005

(51) Int. Cl.
 *H04L 29/06* (2006.01)
(52) U.S. Cl. ......................................................... 726/22
(58) Field of Classification Search ................... 726/1–7, 726/22–25; 709/223–226; 713/67, 189, 713/193; 714/4
 See application file for complete search history.

(56) References Cited

U.S. PATENT DOCUMENTS

| 7,257,630 | B2* | 8/2007 | Cole et al. ..................... 726/25 |
|---|---|---|---|
| 2002/0184533 | A1* | 12/2002 | Fox .............................. 709/224 |
| 2003/0051026 | A1* | 3/2003 | Carter et al. ................. 709/224 |
| 2004/0103315 | A1* | 5/2004 | Cooper et al. .................. 726/25 |
| 2004/0205149 | A1* | 10/2004 | Dillon et al. ................. 709/217 |
| 2004/0221191 | A1* | 11/2004 | Porras et al. ..................... 714/4 |
| 2004/0255167 | A1* | 12/2004 | Knight .......................... 726/24 |
| 2005/0044242 | A1* | 2/2005 | Stevens et al. .............. 709/228 |
| 2005/0172153 | A1* | 8/2005 | Groenendaal ................. 726/25 |
| 2005/0229255 | A1* | 10/2005 | Gula et al. ..................... 726/23 |
| 2006/0023638 | A1* | 2/2006 | Monaco et al. ............. 370/252 |
| 2006/0026669 | A1* | 2/2006 | Zakas ............................. 726/6 |
| 2006/0031476 | A1* | 2/2006 | Mathes et al. ............... 709/224 |
| 2006/0212931 | A1* | 9/2006 | Shull et al. ..................... 726/10 |
| 2007/0192867 | A1* | 8/2007 | Miliefsky ..................... 726/25 |

OTHER PUBLICATIONS

Durgin, N. et al., NetState: A Network Version Tracking System, USENIX 2005 Annual Technical Conference, FREENIX Track—Abstract, [online] [Retrieved on Sep. 19, 2005] Retrieved from the Internet<URL:http://www.usenix.org/events/usenix05/tech/freenix/durgin.html>.
Van Randwyk, J. et al., "NetState A Network Version Tracking System," FREENIX '05, Sandia National Laboratories, Apr. 14, 2005, 5 pages.
"Vanguard Enforcer™: Securing the Mainframe in the Internet Era," Vanguard Integrity Professionals, Inc., 2004, 7 pages.

* cited by examiner

*Primary Examiner*—Gilberto Barron, Jr.
*Assistant Examiner*—Abdulhakim Nobahar
(74) *Attorney, Agent, or Firm*—Fenwick & West LLP

(57) ABSTRACT

An enterprise network can have sanctioned and unsanctioned servers on it. Sanctioned servers are approved by an administrator and perform tasks such as web page serving and mail routing. Unsanctioned servers are not approved by the administrator and represent possible security risks. A service monitor accesses one or more metadata sources having information describing the enterprise network, such as domain name system (DNS) records on the Internet. The service monitor analyzes the metadata and creates a security profile for the enterprise network. The security profile identifies the sanctioned servers. The service monitor monitors network traffic for compliance with the security profile, and detects unsanctioned servers on the network. The service monitor reports violations of the profile and informs the administrator of the unsanctioned servers.

6 Claims, 3 Drawing Sheets

US 7,634,809 B1

DETECTING UNSANCTIONED NETWORK SERVERS

BACKGROUND OF THE INVENTION

1. Field of the Invention

This invention pertains in general to monitoring traffic on computer networks and in particular to monitoring traffic to detect unsanctioned usage of network services.

2. Description of the Related Art

A large enterprise, such as a corporation or government agency, can have a computer network with thousands of computer connected to it. Many of the computers are clients that are used by end-users, such as employees, to perform their day-to-day tasks. These tasks may include writing documents, exchanging emails, and browsing the World Wide Web. Some of the computers are servers that perform dedicated tasks. For example, an email server will route email messages sent or received by the end-users. A web server will serve web pages requested by clients inside or outside the enterprise, and a domain name system (DNS) server will perform domain name resolution in response to client requests.

Often, it is easy for an end-user to turn a client into a server. For example, the end-user can purposely install mail server or web server software on a client. Once this software is activated, the client effectively becomes a server. In another scenario, an end-user can accidentally install software that causes a client to act as a server. The accidental installation can occur, for example, when the end-user downloads malicious software, such as a worm or Trojan horse, from the Internet. Likewise, a worm that penetrates the enterprise's security can install servers on a large number of clients in a short amount of time.

In most enterprises, an administrator is responsible for maintaining the network. Network security is of paramount concern to the administrator, and unsanctioned servers running on client computers represents a large security risk. Therefore, the administrator must constantly monitor the network for unsanctioned servers or other indications of malicious activity.

The administrator's job is difficult because network configurations and topologies change frequently. Client computers are added, mail servers are reconfigured, and countless other changes are made to the network during the day-to-day operations of the enterprise. As a result, an administrator has trouble in both detecting new servers and differentiating between sanctioned and unsanctioned servers. Therefore, there is a need in the art for a way to detect unsanctioned servers.

BRIEF SUMMARY OF THE INVENTION

The above need is met by a service monitor that retrieves metadata about the enterprise network from the Internet or another network. In one embodiment, the metadata include domain name system (DNS) records that describe the enterprise network. The DNS records are typically created by the administrator and describe the enterprise network. The service monitor analyzes the metadata to create a security profile for the enterprise network and, in one embodiment, the security profile identifies the sanctioned servers. Thus, the service monitor leverages DNS records and/or other metadata about the enterprise network to create the security profile.

The service monitor monitors traffic on the enterprise network to determine whether it complies with the security profile. In one embodiment, the service monitor determines whether the traffic indicates that servers are on the network, and determines whether the servers are sanctioned. The service monitor reports violations of the security profile, such as the presence of unsanctioned servers, to the administrator.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
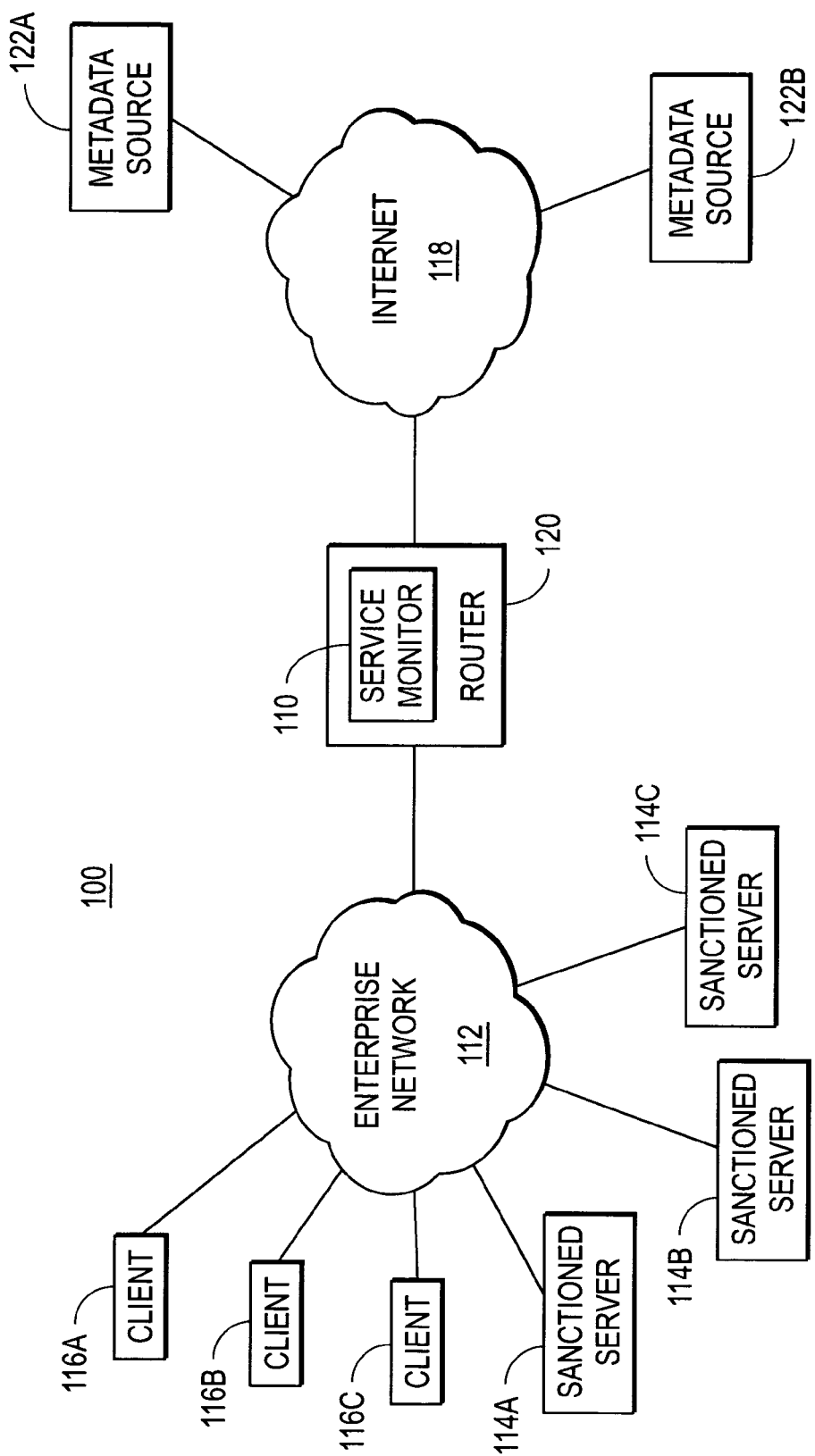
FIG. 1 is a high-level block diagram illustrating a typical environment having a service monitor for detecting unsanctioned servers.

FIG. 1 is a high-level block diagram illustrating a typical environment 100 having a service monitor 110 for detecting unsanctioned servers. The environment 100 includes an enterprise computer network 112. As used herein, the term "enterprise" refers to a business, governmental entity, non-profit organization, family, or other entity having one or more geographic locations.

FIG. 1 and the other figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

The enterprise network 112 enables data communication between and among the entities connected to the network. The network 112 can utilize dedicated or private communications links. In one embodiment, the network 112 uses standard communications technologies and/or protocols. Thus, the network 112 can include links using technologies such as Ethernet, 802.11, integrated services digital network (ISDN), digital subscriber line (DSL), asynchronous transfer mode (ATM), etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 112 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In the illustrated environment 100, the enterprise network 112 has three sanctioned servers 114 and three client computers 116 connected to it. The sanctioned servers 114 are computers that provide services to client computers 116 inside and/or outside the enterprise. For example, a sanctioned servers can include a web server for supporting HTTP requests, an email server supporting the SMTP and/or other mail protocols, such as a Microsoft Exchange server, a key server supporting key exchange protocols, a Domain Name System (DNS) server supporting domain name resolution, etc. These servers are referred to as "sanctioned" because they are known to, and approved by, an administrator of the enterprise network 112. Usually, these servers are installed and actively maintained by the administrator. Although only three sanctioned servers 114 are shown, typical enterprises can have fewer or more servers connected to the enterprise network 112.

The client computers 116 illustrated in FIG. 1 represent the hundreds or thousands of client computers that might be connected to the enterprise network 112. In one embodiment, the client computers 114 are typical personal computers executing operating systems such as Windows, MacOS, Linux, and/or UNIX. In other embodiments, the client computers 116 can include other network-enabled electronic devices, such as cellular telephones, personal digital assistants (PDAs), portable email devices, etc.

The client computers 116 are used by end-users, such as employees of a corporation, to perform tasks including writing documents, exchanging email and other types of messages, browsing the World Wide Web, etc. An end-user can turn a client computer 116 into an unsanctioned server either intentionally or inadvertently. For example, an end-user can intentionally execute software on a client computer 116 that provides server functionality. It is especially easy to execute server programs on Linux and UNIX-based computers.

An end-user can inadvertently create an unsanctioned server by executing malicious software downloaded via the enterprise network 112. For example, the malicious software can be a Trojan horse embedded in seemingly innocent software. Likewise, the malicious software can be a worm that spreads among the computers on the enterprise network 112. The software might install a mail server zombie used to send spam email, a server designed to perform coordinated denial-of-service attacks using protocols such as the Internet Control Message Protocol (ICMP), or perform some other malicious activity.

In the environment shown in FIG. 1, the enterprise network 112 is connected to the Internet 118. As is known in the art, the Internet is a large network of computers. One or more sources of metadata 122 about the enterprise network 112 are available on the Internet 118. In one embodiment, a metadata source 122 is a computer connected to the Internet 118 that stores information about the enterprise network 112 and makes this information accessible to other network-connected entities via conventional and/or proprietary protocols. The metadata can be provided by the entity that the data describes, or by some other entity. For example, metadata about the enterprise network 112 can be provided, either directly or indirectly, by the administrator of the enterprise network 112. Alternatively, the metadata can be provided by some other entity that scans the enterprise network 112 or acquires information about the network in some other fashion.

In one embodiment, the DNS system is a source of metadata. The DNS system is a distributed directory having a hierarchy of DNS servers that are used to route information on the Internet 118. Under the DNS system, the Internet is divided into multiple domains, and each computer on the Internet is assigned to at least one of the domains. A DNS server is authoritative for one or more domains.

The authoritative DNS server for a domain maintains a set of data, called "resource records" that describe how to reach and/or interact with computers within the domain. The format of the resource records are specified by standards organizations and generally describe the addresses and capabilities of servers within the zone for which the server is authoritative. In one embodiment, resource records include:

A (Address) records that store an IP address associated with a domain name.
CNAME (Canonical Name) records that specify the canonical name for a DNS alias.
KX (Key Exchanger) records that identify key exchange servers.
LOC (Location) records that associate a geographical location with a domain name.
MX (Mail Exchanger) records that specify a list of domain names and a priority. The list of mail exchangers is ordered by priority when delivering mail to the domain covered by the records.
NS (Name Server) records that specify a host name where DNS information can be found about the domain name to which the NS record is attached.
SRV (Server Selection) records which are similar to MX records but are generalized to any network service.
TXT (Text String) records which hold an arbitrary text string. This record is sometimes used for storing IP addresses of outgoing mail servers for a given domain.
WSDL (Web Services Description Language) records that specify web servers in a domain that provide Web Services functionality.

The data within the resource records are usually provided by an administrator of the domain to which the records pertain. Thus, assuming that the enterprise network 112 defines all or part of a domain on the Internet, the administrator will configure DNS records of an authoritative DNS server to describe the enterprise network 112.

A router 120 routes traffic between the enterprise network 112 and the Internet 180. Although not shown in the figure, there can be multiple routers connecting the enterprise network 112 and Internet 118. Likewise, there can be multiple other networks or routers connecting the enterprise network 112 to the Internet 118.

The service monitor 110 monitors network traffic on the enterprise network 112 and/or Internet 118 to detect the presence of unsanctioned servers. In the illustrated embodiment, the service monitor 110 is within the router 120 because this represents a convenient point to monitor traffic exchanged between the enterprise network 112 and Internet 118. In another embodiment, the service monitor 110 is located elsewhere on the enterprise network 112 and/or Internet 118. The service monitor 110 in one embodiment is a software module that executes on the router 120 or on a computer in communication with the router.

The service monitor 110 monitors network traffic on the enterprise network 112 and/or Internet 118 to detect the presence of unsanctioned servers. In the illustrated embodiment, the service monitor 110 is within the router 120 because this represents a convenient point to monitor traffic exchanged between the enterprise network 112 and Internet 118. In another embodiment, the service monitor 110 is located elsewhere on the enterprise network 112 and/or Internet 118. The service monitor 110 in one embodiment is a software module that executes on the router 120 or on a computer in communication with the router. The software module can be stored on a computer-readable storage medium as executable computer program code.

Figure 2:
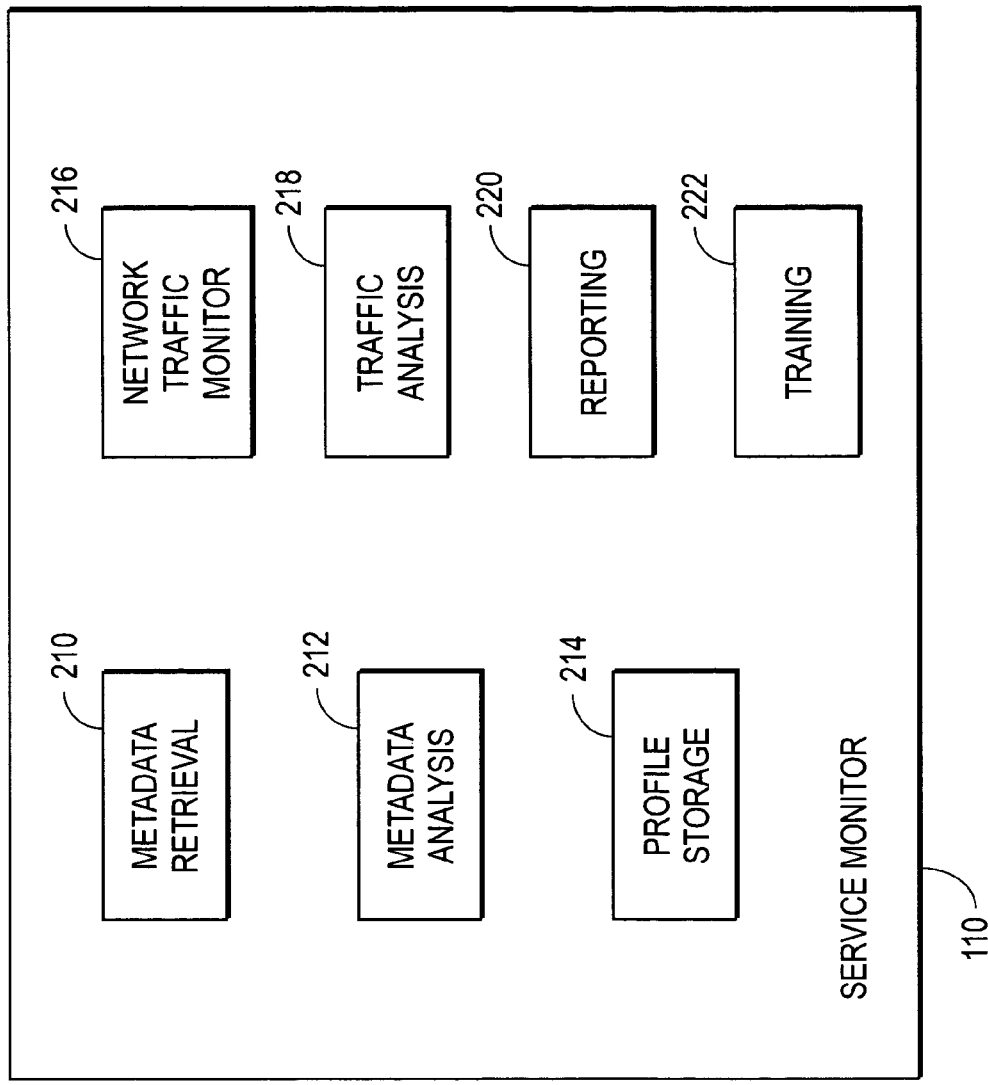
FIG. 2 is a high-level block diagram illustrating the service monitor according to one embodiment.

FIG. 2 is a high-level block diagram illustrating the service monitor 110 according to one embodiment. In the illustrated embodiment, the service monitor 110 is comprised of multiple modules. As used herein the term "module" refers to computer program logic for providing the specified functionality. A module can be implemented in hardware, firmware, and/or software. Depending upon the embodiment, the modules comprising the service monitor 110 can be executed by a general and/or special purpose computing device. For example, the modules can be integrated into a router 120 as shown in FIG. 1 and/or executing on a general purpose computer system connected to the enterprise network 112. Those of skill in the art will understand that other embodiments of the service monitor 110 can have different and/or other modules than the ones described herein. In addition, the functionalities can be distributed among the modules in a manner different than described herein.

The service monitor 110 includes a metadata retrieval module 210 for retrieving metadata from the one or more metadata sources 122 on the Internet 118 or other networks. In one embodiment, the metadata retrieval module 210 connects to one or more DNS servers on the Internet 118 and downloads information about the enterprise network 112 and/or information about other networks that may be relevant to the enterprise network. For example, in one embodiment the metadata retrieval module 210 downloads the resource records for the domain to which the enterprise network 112 belongs from the DNS server.

A metadata analysis module 212 analyzes the downloaded metadata and generates one or more security profiles describing the enterprise network 112. The types of analysis performed by the metadata analysis module 212 can depend upon the type of the metadata. For certain types of metadata, the analysis module 212 can apply one or more heuristics to the metadata in order to extract information about the enterprise network 112. For other types of metadata, the analysis module 212 can apply more straightforward forms of analysis, such as mapping information in the metadata directly to the security profile. For example, in one embodiment where the metadata are DNS records, the metadata analysis module 212 can explicitly identify the incoming mail servers for the enterprise network 112 from the MX record. Similarly, the metadata analysis module 212 can identify a web server on the enterprise network 112 by resolving the domain name www.enterprise.com (where "enterprise" is the domain associated with the enterprise network).

A profile storage module 214 stores one or more security profiles. The stored security profiles can be generated by the metadata analysis module 212 and/or obtained from another source (such as through direct data entry by the administrator). The security profile describes the configuration and/or topology of the enterprise network 112. In one embodiment, the security profile identifies sanctioned servers 114 on the network, thus allowing unsanctioned servers to be identified. The sanctioned servers 114 can be specified by an IP address, host name, network identifier, and/or some other technique. In one embodiment, the security profile also contains information about each identified server, such as the type of server and/or the protocols that the server is expected to use. For example, in an embodiment where the metadata analysis module 212 identifies the enterprise's mail servers from the MX records, the security profile can contain the IP addresses of the mail servers and an indication that the servers are expected to use the SMTP protocol and port 25.

A network traffic monitor module 216 monitors traffic on the enterprise network 112. In one embodiment, the traffic monitor 216 monitors traffic between the enterprise network 112 and the Internet. In other embodiment, the traffic monitor 216 monitors traffic between the enterprise network 112 and another network, traffic on just a portion of the enterprise network, and/or other network traffic as may be warranted. In one embodiment, the traffic monitor 216 monitors only traffic outbound from the enterprise network 112. In other embodiments, the traffic monitor 216 monitors inbound traffic, both inbound and outbound traffic, or only a subset of traffic in either direction.

As is known in the art, TCP/IP traffic is comprised of multiple packets. In one embodiment, the traffic monitor 216 examines packet headers to learn the IP address of the computer that originated given traffic and the IP address and/or port number of the computer to which the traffic is directed. In another embodiment, the traffic monitor 216 observes the contents of the packets in addition to, or instead of, observing packet headers. In one embodiment, the traffic monitor 216 performs stateful inspection of the network traffic.

A traffic analysis module 218 analyzes the network traffic monitored by the network traffic monitor 216 to determine whether it is in compliance with a security profile stored by the profile storage module 214. In one embodiment, the traffic analysis module 218 determines whether the network traffic indicates that an unsanctioned server is operating on the enterprise network 112. The traffic analysis module 218 can make this determination by examining the traffic observed by the network traffic monitor 216 to detect the presence of servers. For example, if the analysis module 218 observes traffic outbound from the enterprise network on port 80, then this is indicative of a web server. Further, outbound traffic on port 25 and/or a packet containing the string "HELO" is indicative of a SMTP server. The traffic analysis module 218 compares the servers detected through traffic analysis with the list of sanctioned servers contained in the applicable security profile. Servers on the enterprise network 112 that are not listed in the security profile are potentially unsanctioned.

A reporting module 220 reports the results of the traffic analysis module 218 to the administrator. In general, the reports, describe deviations from the security profile. More specifically, the reports inform the administrator that an unsanctioned server is operating on the enterprise network 112. The specific types of events that generate reports can vary depending upon the embodiment. For example, the reporting module 220 can be configured to generate a report each time it detects an unsanctioned server, for only certain types of unsanctioned servers (e.g., HTTP, SMTP), for unsanctioned servers that have been instantiated for longer than a specified time period, etc. Likewise, the types of reports can vary depending upon the embodiment. Types of reporting can include saving data in a log file, generating an alert message on a computer console, sending an email message, etc. In one embodiment, the reporting module 220 can also perform other actions, such as blocking traffic to/from an unsanctioned server and/or interacting with a firewall or other network device to secure the network. In one embodiment, the reporting module 220 retrieves configuration information describing the actions it should take from the security profile.

In one embodiment, the service monitor 110 includes a training module 222 for training the metadata analysis 212, traffic analysis 218, reporting 220 and/or other modules. In one embodiment, the service monitor 110 is utilized in an observation mode where the training module 222 observes the various analysis and reports produced by the other modules and becomes familiar with the normal operation of the network 112. The training module 222 can, for example, utilize artificial intelligence techniques such as fuzzy logic and/or neural networks to build a model of the network 112 that incorporates the metadata analysis and the operation observed during the training period. In one embodiment, the training module 222 stores data in the security profile stored by the profile storage module 214. The other modules utilize these data to alter their operation in conformance with the security profile. The training module 222 thus reduces false positive and/or negative detections of unsanctioned servers or other deviations from the security profile.

In one embodiment, use of the training module 222 allows thresholds to be associated with various services and/or computers on the enterprise network 112. For example, assume a sanctioned server 114 on the enterprise network 112 normally initiates 10 SMTP connections per day. The training module 222 can observe this normal usage, and cause the reporting module 220 to generate report if the computer initiates 500 connections on a given day. In another embodiment, the service monitor 110 supports the use of thresholds when the training module 222 is absent.

Figure 3:
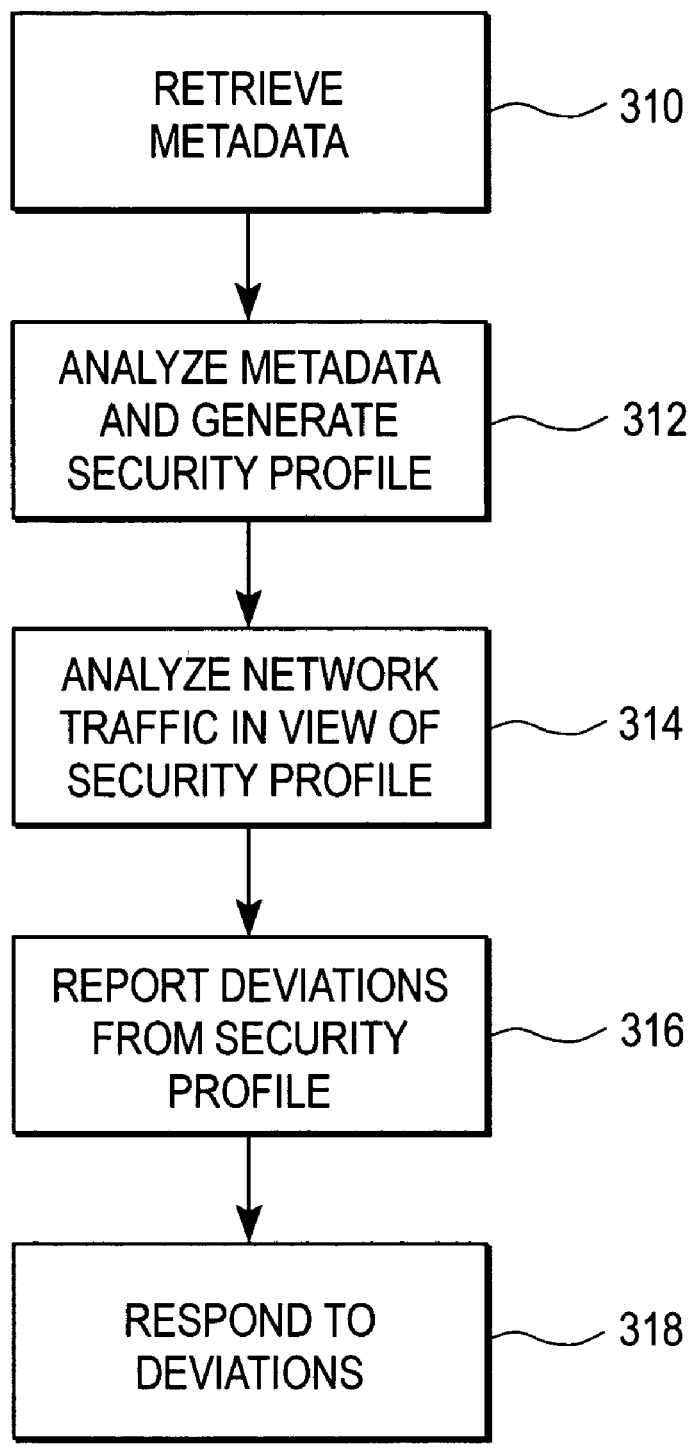
FIG. 3 is a flowchart illustrating steps performed by the service monitor according to one embodiment.

FIG. 3 is a flowchart illustrating steps performed by the service monitor 110 according to one embodiment. Those of skill in the art will recognize that some embodiments can perform different and/or additional steps than the ones described here. Moreover, embodiments can perform the steps in different orders.

The service monitor 110 retrieves 310 metadata from one or more metadata sources 122 on the Internet 118 or another network. The service monitor 110 analyzes 312 the metadata 212 in order to learn about the enterprise network 112. In one embodiment, the analysis of the metadata identifies the sanctioned servers 114 that are operating on the enterprise network 112. The results of this analysis are used to build 312 a security profile.

The service monitor 110 monitors and analyzes 314 traffic passing between the enterprise network 112 and the Internet 118 or another network. The service monitor 110 detects traffic indicating that an entity on the enterprise network 112 is operating a server, and consults the security profile to determine whether the server is sanctioned. The service monitor 110 reports 316 any detected unsanctioned servers and/or other deviations from the security profile. The service monitor 110, another entity on the network, and/or the administrator responds 318 to the deviations from the security profile by blocking traffic from the unsanctioned server, shutting down the unsanctioned server, and/or performing another action.

In one embodiment, the step of analyzing network traffic 314 is performed continuously while the service monitor is in use, with the reporting 316 and responding 318 steps are performed occasionally as events warrant. The frequency at which the metadata is retrieved 310 and used for building 312 a security profile also depends upon the embodiment. For example, in one embodiment it might be desirable to retrieve metadata and rebuild the security profile at regular intervals in order to respond to changes in the enterprise network.

In one embodiment, some or all of the steps described above occur during a training period where the service monitor 110 is being trained to recognize the normal operation of the enterprise network 112. This training period may occur, for example, when the service monitor 110 is first introduced to the network 112 or when an administrator makes major changes to the network. Upon completion of the training period, the service monitor resumes analyzing 314 the network traffic in view of the security profile.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method of monitoring an enterprise network, comprising:

retrieving metadata describing the enterprise network from the Internet, wherein the metadata comprises domain name system (DNS) records describing the enterprise network;

analyzing the metadata describing the enterprise network, the analyzing comprising analyzing one or more of the DNS records to identify a set of sanctioned servers on the enterprise network;

generating a security profile responsive to the metadata, the security profile describing an expected usage of the enterprise network and identifying the set of sanctioned servers on the enterprise network;

analyzing traffic on the enterprise network using the security profile to determine whether the traffic indicates that an unsanctioned server is operating on the enterprise network; and reporting an indication of an unsanctioned server operating on the enterprise network, the reporting comprising retrieving configuration information from the security profile describing an action to take responsive to the indication of the unsanctioned server, the action including one or more of:

blocking traffic to the unsanctioned server;

blocking traffic from the unsanctioned server; and interacting with a network device to secure the network.

2. The method of claim 1, further comprising:

observing an operation of the enterprise network during a training period to generate training data; and utilizing the training data to influence the analysis of the traffic and/or the reporting of unsanctioned servers operating on the enterprise network.

3. A system for monitoring an enterprise network, comprising:

a computer-readable storage medium storing executable computer program code modules, comprising:

a metadata retrieval module for retrieving metadata describing the enterprise network from the Internet, wherein the metadata comprises domain name system (DNS) records describing the enterprise network;

a metadata analysis module for analyzing the metadata describing the enterprise network, the analyzing comprising analyzing one or more of the DNS records to identify a set of sanctioned servers on the enterprise network, and for generating a security profile describing an expected usage of the enterprise network and identifying the set of sanctioned servers on the enterprise network;

a traffic analysis module for analyzing traffic on the enterprise network using the security profile to determine whether the traffic indicates that an unsanctioned server is operating on the enterprise network; and a reporting module for reporting an indication of an unsanctioned server operating on the enterprise network, the reporting comprising retrieving configuration information from the security profile describing an action to take responsive to the indication of the unsanctioned server, the action including one or more of:

blocking traffic to the unsanctioned server;

blocking traffic from the unsanctioned server; and interacting with a network device to secure the network.

4. The system of claim 3, wherein the computer-readable storage medium further comprises:
   a training module for observing an operation of the enterprise network during a training period to generate training data,
   wherein the training data are utilized by the metadata analysis module and/or the reporting module.

5. A computer-readable storage medium having executable computer program code modules embodied therein for monitoring an enterprise network, comprising:
   a metadata retrieval module for retrieving metadata describing the enterprise network from the Internet, wherein the metadata comprises domain name system (DNS) records describing the enterprise network;
   a metadata retrieval module for analyzing the metadata describing the enterprise network, the analyzing comprising analyzing one or more of the DNS records to identify a set of sanctioned servers on the enterprise network, and for generating a security profile describing an expected usage of the enterprise network and identifying the set of sanctioned servers on the enterprise network;
   a traffic analysis module for analyzing traffic on the enterprise network using the security profile to determine whether the traffic indicates that an unsanctioned server is operating on the enterprise network; and
   a reporting module for reporting an indication of an unsanctioned server operating on the enterprise network, the reporting comprising retrieving configuration information from the security profile describing an action to take responsive to the indication of the unsanctioned server, the action including one or more of:
   blocking traffic to the unsanctioned server;
   blocking traffic from the unsanctioned server; and
   interacting with a network device to secure the network.

6. The computer-readable storage medium of claim 5, further comprising:
   a training module for observing an operation of the enterprise network during a training period to generate training data,
   wherein the training data are utilized by the metadata analysis module and/or the reporting module.

* * * * *